United States Patent [19]

Suzuki

[11] Patent Number: 4,890,707
[45] Date of Patent: Jan. 2, 1990

[54] CONTROL SYSTEM FOR A LOCKUP CLUTCH FOR AN AUTOMATIC TRANSMISSION

[75] Inventor: Hosei Suzuki, Tokyo, Japan

[73] Assignee: Fuji Jukogyo Kabushiki Kaisha, Tokyo, Japan

[21] Appl. No.: 198,395

[22] Filed: May 24, 1988

[30] Foreign Application Priority Data

May 30, 1987 [JP] Japan ................................ 62-137851

[51] Int. Cl.$^4$ ........................ F16D 47/02; F16D 25/14
[52] U.S. Cl. ..................................... 192/3.3; 192/3.31
[58] Field of Search ....................... 192/3.28, 3.29, 3.3, 192/3.31, 103 F; 74/866

[56] References Cited

U.S. PATENT DOCUMENTS 4,466,311  8/1984  Hiramatsu ............................. 74/866
4,573,375  3/1986  Hamada et al. ....................... 74/866

FOREIGN PATENT DOCUMENTS 57-157860   9/1982  Japan .................................. 192/3.31
57-163732  10/1982  Japan .................................. 192/3.3
60-151457   8/1985  Japan .................................. 192/3.3

Primary Examiner—Rodney H. Bonck
Assistant Examiner—David A. Testardi
Attorney, Agent, or Firm—Martin A. Farber

[57] ABSTRACT

An automatic transmission has a lockup clutch having a release side chamber and an apply side chamber. A lockup control valve having a spool is provided for controlling oil supplied to the release side chamber and apply side chamber. A solenoid operated valve is provided for controlling position of the spool of the lockup control valve to control pressure of oil supplied to the release side and apply side of chamber. A sensor is provided for sensing rotational speed of an output shaft of the automatic transmission. The solenoid operated valve is operated by a signal representing amplitude of variation of the output of the sensor, thereby controlling the pressure of the oil to increase of slipping the lockup clutch with increase of the amplitude.

13 Claims, 6 Drawing Sheets

CONTROL SYSTEM FOR A LOCKUP CLUTCH FOR AN AUTOMATIC TRANSMISSION

BACKGROUND OF THE INVENTION

The present invention relates to a lockup clutch of a torque converter for an automatic transmission of a motor vehicle, and more particularly to a system for controlling the lockup clutch.

A lockup clutch of a torque converter is disposed in a converter cover. The lockup clutch has a lockup piston and is brought into lockup state or release state by controlling oil pressures applied to a release chamber and to an apply chamber on opposite sides of the piston so as to engage and disengage the piston with respect to the converter cover. When the lockup clutch is engaged, the power of an engine is directly transmitted to the automatic transmission.

However, if the engine speed becomes low in the lockup state, the variation of the engine speed in accordance with a change of the engine torque is transmitted to the transmission to cause oscillation and noise.

At a low speed range of the vehicle, since the output power of the engine and the transmitting torque are small, the torque capacity of the lockup clutch can be reduced to avoid the occurrence of oscillation and noise. In order to reduce the torque of the lockup clutch, the lockup clutch is controlled to temporarily slip in accordance with variation of the engine speed and the engine torque. Thus, the transmission of the engine speed is reduced to effectively reduce the oscillation and noise.

Japanese Patent Application Laid-Open 57-163732 discloses a system for controlling a lockup clutch by causing the clutch to slip. The system has a torque variation detecting device for detecting the frequency of the torque variation and for controlling the slip of the lockup clutch in accordance with the torque variation.

However, in such a system, since a torque variation detecting device is employed, the system becomes expensive. Further, since the slipping is controlled in response to the frequency of the torque variation, it is difficult to properly control the slipping of the clutch in accordance with the magnitude of the variation.

SUMMARY OF THE INVENTION

The object of the present invention is to provide a controls system for the lockup clutch which accurately control the slipping of the lockup clutch with simple means.

According to the present invention, there is provided a control system for a torque converter for an automatic transmission of a motor vehicle driven by an engine, the torque converter having a lockup clutch provided with a release side chamber and an apply side chamber, the system comprising, a lockup control valve having a spool for controlling oil supplied to the release side chamber and apply side chamber, spool control means for controlling position of the spool to control pressure of oil supplied to the release side and apply side chambers, a sensor for sensing rotational speed of an output member of the automatic transmission, means for calculating an amplitude of variation of the rotational speed and for producing a signal representing the amplitude of variation of the rotational speed, operating means responsive to the signal for operating the spool control means, so as to control the pressure of the oil to increase slipping of the lockup clutch with increase of the amplitude.

In an aspect of the invention, the spool control means is a solenoid operated valve operated by pulses, the duty cycle of which is controlled in accordance with the amplitude.

These and other objects and features of this invention will become understood from the following description with reference to the accompanying drawings.

DETAILED DESCRIPTION OF THE PREFERRED EMBODIMENT

Figure 1A:
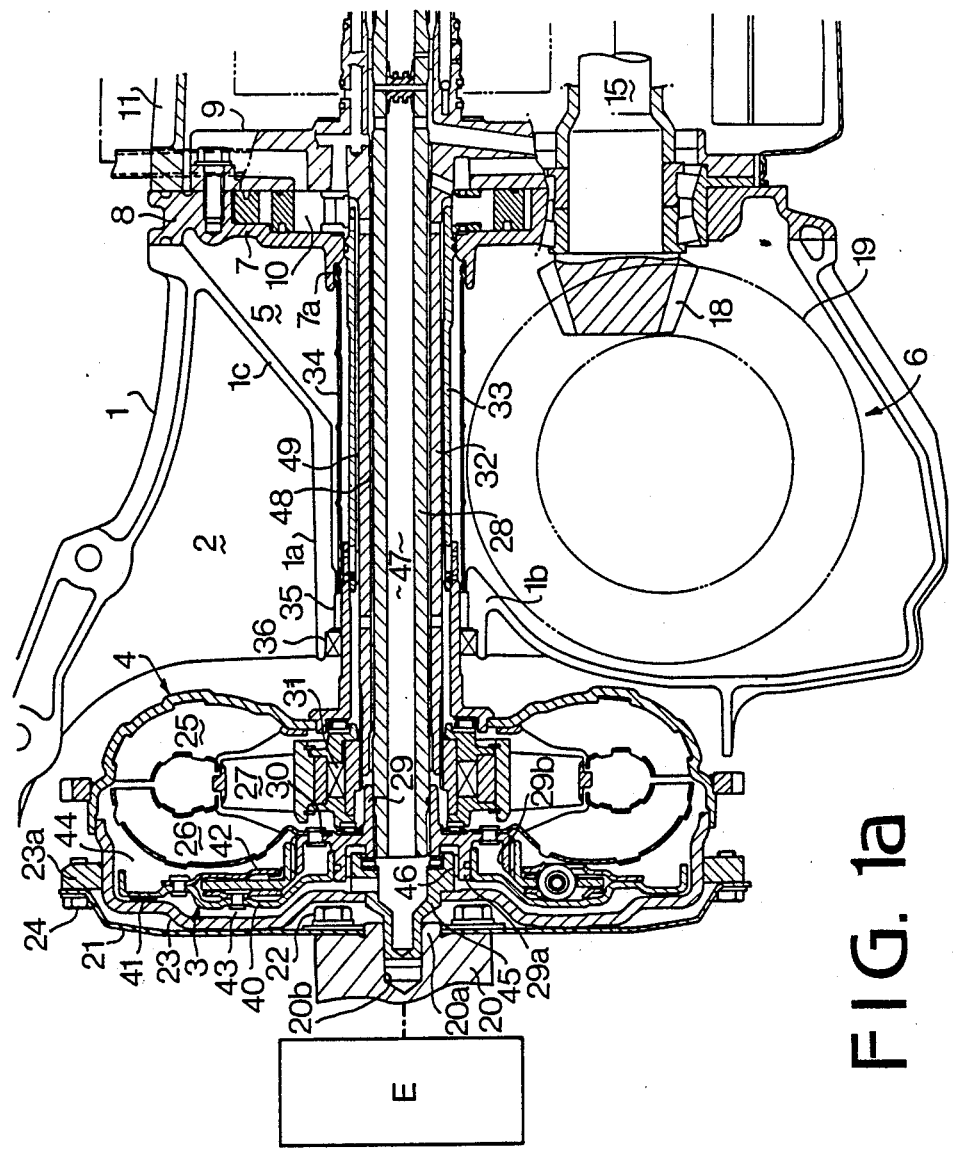
FIGS. 1a and 1b show a sectional view of an automatic transmission to which the present invention is applied.
Figure 1B:
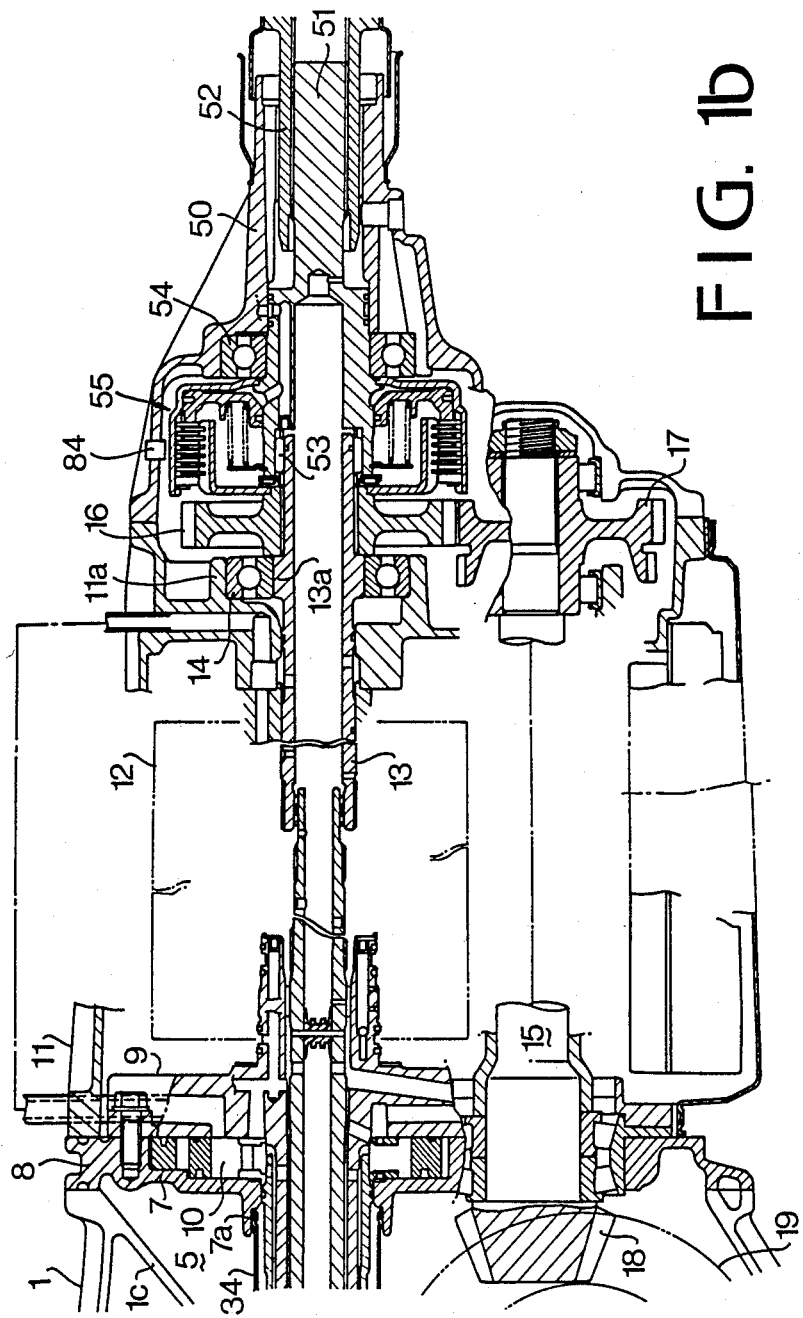

FIGS. 1a and 1b show a power transmission system for a motor vehicle having an engine E at a front portion thereof. The power transmission system has a differential case 1 made of aluminum, a torque converter 4 with a lockup clutch 3 mounted in a converter box 2, and a differential 6 mounted in a differential box 5 behind the torque converter 4. The differential case 1 has a cylindrical portion 1a, and a lower partition 1b and an inclined partition 1c which define a front side compartment and a rear side compartment. To the rear end of the differential case 1, a shaft supporting plate 8 having a pump housing 7 is attached. An oil pump 10 is housed in the pump housing 7 and a cover 9. A transmission case 11 housing an automatic transmission 12 is attached to the rear of the shaft supporting plate 8.

A crankshaft 20 of the engine E has a boss 20a to which a drive plate 21 is fixed by bolts 22. A converter cover 23 is secured to the drive plate 21 by bolts 24 at a flange 23a. The torque converter 4 comprises an impeller 25 integral with the converter cover 23 by welding, a turbine 26 and a stator 27 connected to a hollow stator shaft 32 through a one-way clutch 31. The turbine 26 is fixed by rivets 30 to a disc having a turbine hub 29 which is splined to an input shaft 28 disposed in the stator shaft 32.

The input shaft 28 extends into the transmission case 11. The stator shaft 32 is integral with the cover 9 of the oil pump 10. A pump drive shaft 33 surrounding the stator shaft 32 is connected to the impeller 25 and is operatively connected with a rotor of the oil pump 10. In order to prevent leakage of automatic transmission fluid and mixing of the fluid with oil for differential gears, a seal pipe 34 for covering the pump drive shaft 33 is further provided. The front end portion of the seal pipe 34 is tightly embedded in the cylindrical portion 1a of the differential case 1 through a bush 35 and sealed by an oil seal 36 to prevent the oil from leaking. The rear end is tightly embedded in a boss 7a of the pump housing 7. The seal pipe 34 collects the oil leaked from the pump drive shaft 33 and from the oil pump 10 to separate the oil for the differential gears from the oil for the automatic transmission.

The lockup clutch 3 of the torque converter 4 has a lockup piston 40 disposed adjacent the converter cover 23. Near the periphery of the lockup piston 40, a facing 41 is attached adjacent the cover 23 for making contact with the cover 23. A torsion damper 42 is attached to the lockup piston 40 adjacent the turbine 26. A release side oil chamber 43 for applying release pressure to the lockup piston 40 is defined in a front portion of the lockup piston 40. Behind the lockup piston 40, an apply side oil chamber 44 connected to the torque converter 4 is formed for applying lockup pressure to the lockup piston 40.

A hollow pilot boss 45 is engaged with the converter cover 23 and is secured thereto. The pilot boss 45 projects out of the converter cover 23 and is engaged with hole 20b formed in the center of the crankshaft 20.

The turbine boss 29 has an annular inner boss 29a and an annular outer boss 29b. The pilot boss 45 is mounted in the inner boss 29a, interposing a bush 46 so that the turbine 26 is rotatably supported on the pilot boss 45. Slidably mounted on the inner boss 29a is the lockup piston 40. A hub of the torsion damper 42 engages with the outer boss 29b through splines.

The oil in the turbine 26 of the torque converter 4 is further supplied to the apply side chamber 44 to urge the lockup piston 40 toward the converter cover 23. The pressure of oil in the release side chamber 43 is set to a value slightly higher than that of the apply side chamber 44 to disengage the lockup piston 40 from the converter cover 23.

A hydraulic circuit for the torque converter 4 comprises an oil passage 47 formed in the input shaft 28 for the release of the lockup clutch 3. The passage 47 is communicated with the release side oil chamber 43 through the hollow of the pilot boss 45. An oil passage 48 formed between the input shaft 28 and the stator shaft 32 is communicated with the turbine 26 and the apply side oil chamber 44. A drain passage 49 for draining the oil in the impeller 25 is formed between the stator shaft 32 and the pump drive shaft 33.

The automatic transmission 12 has a well known structure and operates to transmit the power of the engine to an output shaft 13 which is disposed at the rear end of the input shaft 28. The output shaft 13 has a boss 13a formed on a rear portion to be rotatably mounted in a cylindrical portion 11a of the transmission case 11, interposing a bearing 14, so that the output shaft 13 is rotatably supported in the transmission case 11.

A front drive shaft 15 is provided in parallel with the input shaft 28 and the output shaft 13. A reduction gear 16 mounted on the output shaft 13 engages with a reduction gear 17 mounted on the front drive shaft 15. Thus, the power of the engine transmitted to the rear side of the transmission is transmitted to the front side thereof. An end drive pinion 18 of the front drive shaft 15 engages with a crown gear 19 of the differential 6 to transmit the power of the engine to the front drive wheels of the vehicle.

An extension case 50 is connected to the rear end of the transmission case 11, and a transfer shaft 51 and a rear drive shaft 52 are disposed in the case 50. The transfer shaft 51 is provided coaxially with the output shaft 13 and rotatably mounted on the output shaft through a needle bearing 53. The transfer shaft 51 is further mounted in the extension case 50, interposing a bearing 54. A transfer clutch 55 is mounted on the transfer shaft 51. Adjacent the transfer clutch 55, a vehicle speed sensor 84 is mounted for sensing rotational speed of a driven shaft member. The rear drive shaft 52 is splined to the transfer shaft 51 to transmit the power of the engine to the rear drive wheels of the vehicle through a propeller shaft (not shown).

Figure 2A:
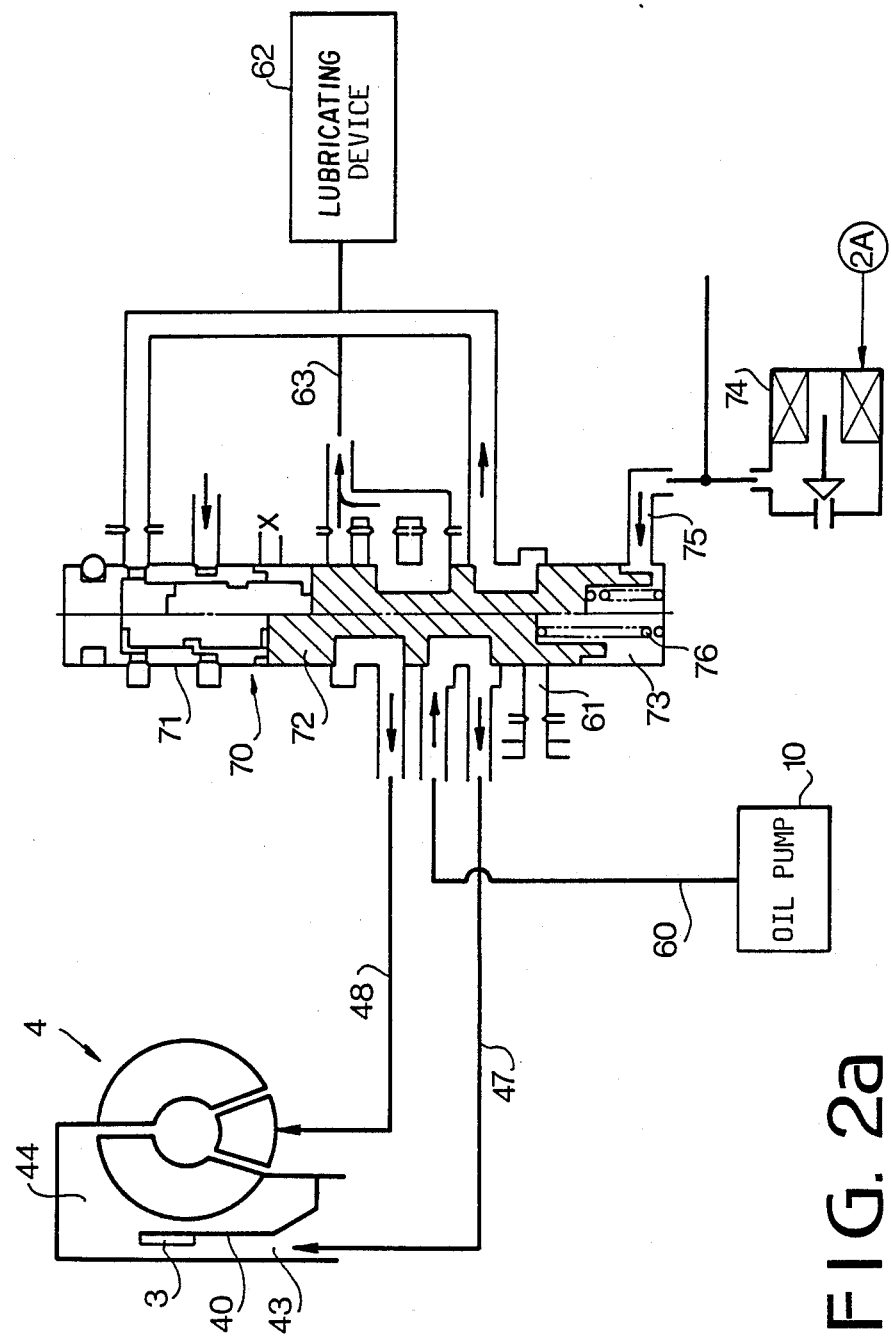
FIGS. 2a and 2b show a schematic diagram of a control unit for a lockup clutch.
Figure 2B:
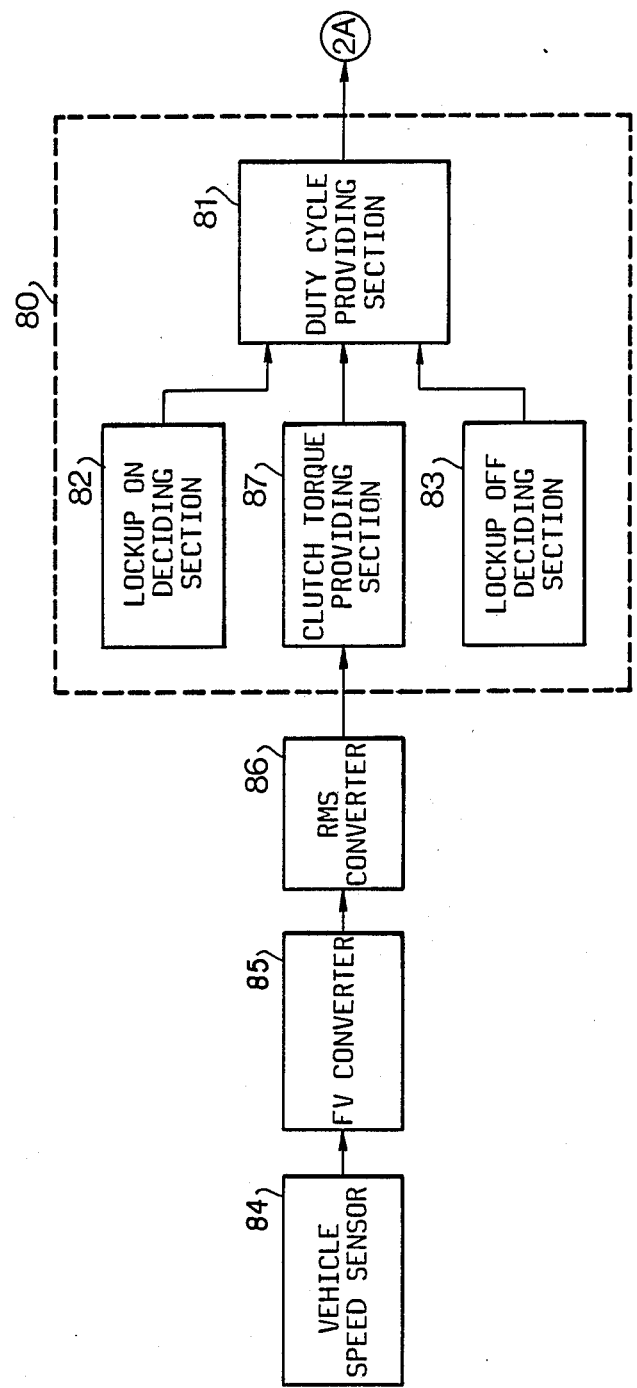

Referring to FIGS. 2a and 2b showing a control unit for the lockup clutch 3, an oil supply passage 60 connected to the oil pump 10 is communicated with a lockup control valve 70. The lockup control valve 70 comprises a valve body 71, a spool 72, an end chamber 73, and a spring 76 provided in the chamber 73. The lockup control valve 70 is communicated with the release side oil chamber 43 of the lockup clutch 3 through the passage 47. The apply side oil chamber 44 is communicated with the lockup control valve 70 through the passage 48, and with a lubricating device 62 through a passage 63. The end chamber 73 is communicated with a solenoid operated valve 74 through a passage 75. The solenoid valve 74 is operated by a pulse signal from a control unit 80 and produces a duty pressure for controlling the lockup control valve 70.

The control unit 80 comprises a duty cycle providing section 81 which is applied with signals from a lockup ON deciding section 82 and a lockup OFF deciding section 83 for determining the duty cycle in accordance with these signals and for producing a duty cycle signal which is supplied to a coil of the solenoid operated valve 74. When the duty cycle providing section 81 is applied with an OFF signal from the section 83, the section 81 decreases the duty cycle and a small duty cycle signal is applied to the solenoid operated valve 74 to increase the duty pressure. When an ON signal is applied from the section 82, the section 81 produces a large duty cycle signal to decrease the duty pressure at the solenoid valve 74.

Figure 3:
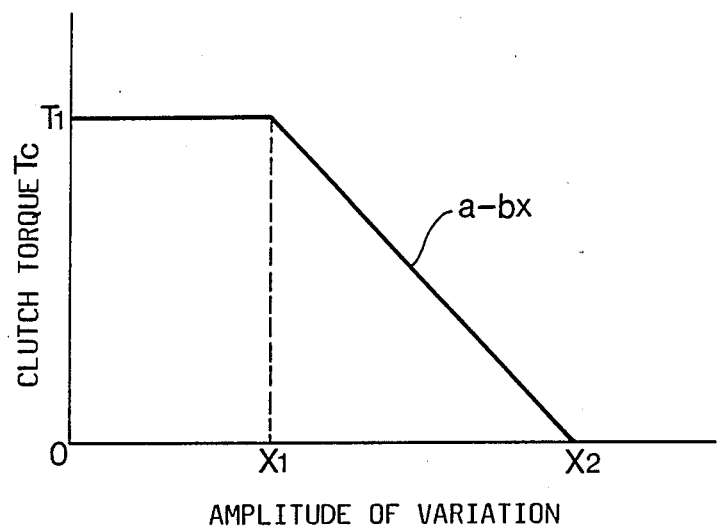
FIG. 3 is a graph showing a clutch torque characteristic.

In the control unit 80, a clutch torque providing section 87 is provided for controlling the slipping of the lockup clutch 3. The output signal of the vehicle speed sensor 84 is fed to the clutch torque providing section 87 through an F/V (frequency/voltage) converter 85 and an RMS (root mean square) converter 86. The pulse signal from the vehicle speed sensor 84 (a rotational speed sensor for the output shaft) is converted into an analog signal at the F/V converter 85. At the RMS converter 86, amplitude X of the variation of the rotational speed is calculated and the amplitude X is supplied to the section 87. The section 87 is provided with a memory map as shown in FIG. 3 and clutch torque (capacity) is derived from the map in accordance with amplitude X. For example, if the amplitude X is between predetermined set values X1 and X2, the section 87 decreases the clutch torque Tc to increase the slipping of the lockup clutch and a signal is supplied to the duty cycle providing section 81.

Describing the operation of the control unit, when the vehicle is driven at a low speed, the lockup OFF deciding section 83 produces the lockup OFF signal and a small duty cycle is determined at the duty cycle providing section 81. Thus, a high duty pressure of the solenoid operated valve 74 is supplied to the chamber 73 of the lockup control valve 70. The spool 72 is upwardly shifted (FIG. 2a) to communicate the passage 60 with the passage 47. Thus, oil pressure is applied to the release side oil chamber 43 through the passage 47. Accordingly, the lockup piston 40 is urged by the difference of the oil pressures in the chambers 43 and 44 to disengage the lockup clutch 3 from the converter cover 23. The oil in the chamber 43 is fed to the torque converter 4 through the chamber 44, and further to the lubricating device 62 through the passages 48 and 63.

When the speed of the vehicle becomes high and the lockup ON deciding section 82 produces the lockup ON signal, the duty cycle providing section 81 determines the large duty cycle. The solenoid valve 74 applies a low duty pressure to the chamber 73. Thus, the spool 72 is downwardly shifted to communicate the passage 47 with a drain passage 61, and the passage 60 with the passages 48 and 63. Thus, the oil in the release side chamber 43 is drained, and the pressurized oil is supplied to the apply side oil chamber 44 through the torque converter 4. The lockup piston 40 is pushed by the oil pressure toward the apply side chamber 44. Thus, the lockup piston 40 comes in contact with the converter cover 23 to engage the lockup clutch 3. Accordingly, the engine power is directly transmitted to the input shaft 28.

Figure 4:
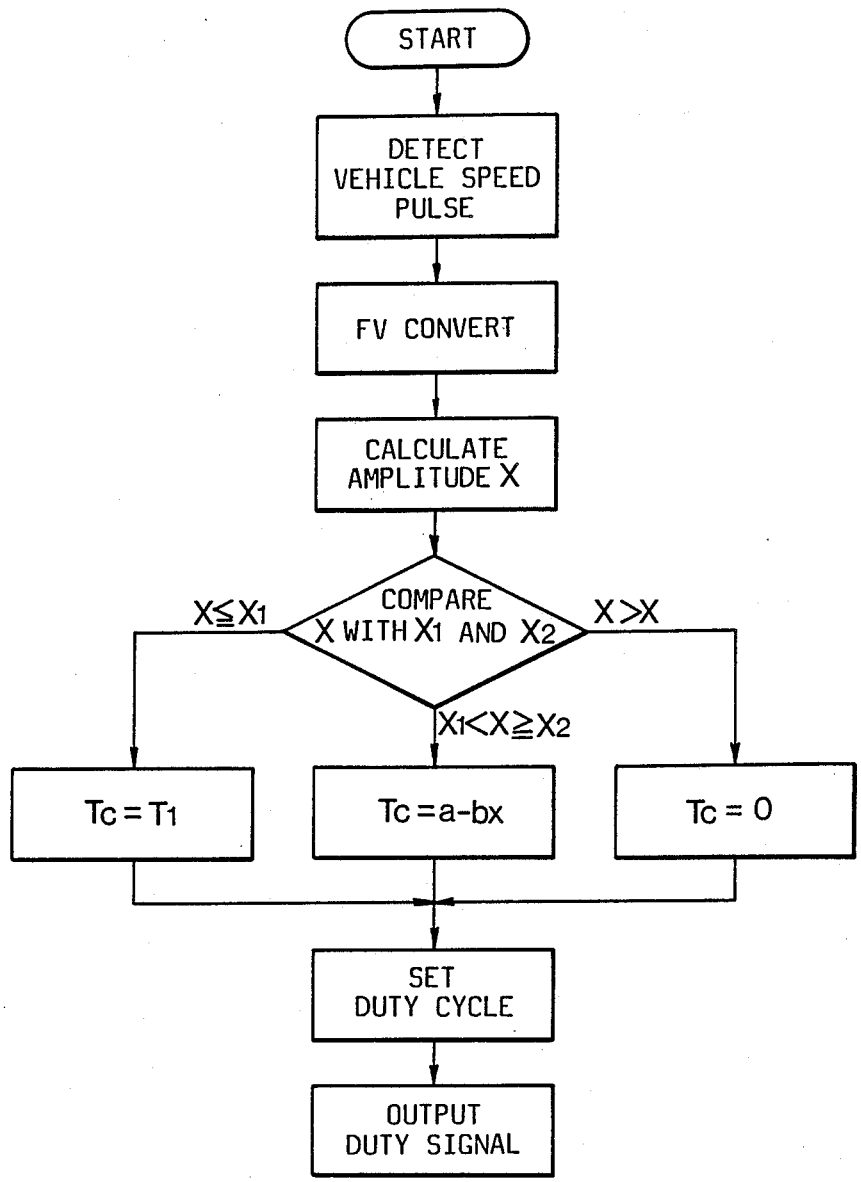
FIG. 4 is a flow chart showing the operation of the system.

When the lockup ON state is determined at a low speed driving range, the slipping control of the lockup clutch is operated. The operation will be described with reference to the flow chart of FIG. 4.

The pulse signal detected by the vehicle speed sensor 84 is converted at the F/V converter 85 and the RMS converter 86 to calculate the amplitude X. The amplitude X is compared with the values X1 and X2 in the map in a clutch torque providing section 87.

When the value X is smaller than the value X1 ($X \leq X1$), the clutch torque Tc is set to a high clutch torque T1 at the section 87. The duty cycle providing section 81 determines the duty cycle based on this clutch torque T1 and produces the duty signal. Accordingly, the duty pressure at the solenoid operated valve 74 is not increased to maintain the lockup state.

When the amplitude X becomes larger than the set value X1 and smaller than the set value X2 ($X1 < X \leq X2$), the clutch torque Tc is set to $Tc = a - bx$ to decrease the clutch torque. The duty pressure is slightly increased so that the oil in the passage 60 is supplied to the release side oil chamber 43 through the passage 47. The engagement of the lockup piston 40 decreases to cause the slipping of the lockup clutch 3. If the value X becomes large, the slipping increases. Accordingly, the engine power transmitted by the torque converter 4 increases, thereby absorbing the component of the variation of rotational speed.

When the value X is larger than the set value X2 ($X > X2$), the clutch torque Tc is set to zero. The control unit operates in the same manner as the lockup OFF state. Thus, the torque converter 4 operates to transmit the power of the engine to the automatic transmission for absorbing the variation of rotational speed.

In place of the vehicle speed sensor, an acceleration sensor can be used for the slipping control by shaping waveforms of the amplitude.

In accordance with the present invention, the control system is employed with a sensor such as a vehicle speed sensor which is inherently provided in the vehicle, thereby lowering the cost of the system. The slipping of the lockup clutch is properly controlled in accordance with the variation of rotational speed detected by the sensor.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A control system for a torque converter for an automatic transmission of a motor vehicle driven by an engine, the torque converter having a lockup clutch provided with a release side chamber and an apply side chamber, comprising:
    a lockup control valve having a displaceable spool for controlling oil supplied to the release side chamber and apply side chamber, respectively;
    spool control means for controlling position of the spool to control pressure of oil supplied to the release side and apply side chambers, respectively;
    a sensor for sensing rotational speed of an output member of the automatic transmission;
    means for calculating amplitude of variation of said rotational speed and for producing a signal representing said amplitude;
    operating means responsive to the signal for operating the spool control means so as to control the pressure of the oil to increase slipping of the lockup clutch with increase of the amplitude;
    said operating means includes a table for comparing said amplitude with a first predetermined amplitude and for producing, via the spool control means, clutch torque of full engagement when said amplitude is less than said predetermined amplitude and a decreasing clutch torque only as said amplitude increases greater than said first predetermined amplitude but less than a second predetermined amplitude which is greater than said first predetermined amplitude.

2. The system according to claim 1 wherein the sensor is a vehicle speed sensor provided in the automatic transmission.

3. The system according to claim 1 wherein the spool control means is a solenoid operated valve operated by pulses 1a duty cycle of which is controlled in accordance with the amplitude.

4. The system according to claim 3 wherein the operating means is means for producing pulses.

5. A control system according to claim 1, further comprising
    an F/V converter connected to said sensor and a RMS converter for producing said amplitude connected to said F/V converter and to said operating means.

6. A control system according to claim 1, wherein said operating means comprises a clutch torque providing section.

7. A control system according to claim 1, wherein said clutch torque decreases linearly with said increasing amplitude greater than said first predetermined amplitude but less than said second predetermined amplitude.

8. A control system according to claim 1, wherein said operating means comprises
    a clutch torquee providing section,
    a lockup on deciding section,
    a lockup off deciding section, and
    a duty cycle providing section operatively connected to said spool control means and to the other of said sections.

9. A control system according to claim 8, wherein said operating means is operated in response to a low vehicle speed driving range detected by said sensor and a lockup off condition of the lockup clutch decided by said lockup off deciding section.

10. A control system according to claim 1, wherein said clutch torque is set to zero when said amplitude is greater than said second predetermined amplitude.

11. A control system according to claim 1, wherein said operating means is operated in response to a low vehicle speed driving range detected by said sensor.

12. A control system according to claim 1, wherein said operating means is for providing, via said spool control means, clutch torque of no engagement when said amplitude represented by said signal produced by said calculating means is greater than second predetermined amplitude.

13. A control system for a torque converter for an automatic transmission of a motor vehicle driven by an engine, the torque converter having a lockup clutch provided with a release side chamber and an apply side chamber, comprising:

a lockup control valve having a displaceable spool for controlling oil supplied to the release side chamber and apply side chamber, respectively;

spool control means for controlling position of the spool to control pressure of oil supplied to the release side and apply side chambers, respectively;

a sensor for sensing rotational speed of an output member of the automatic transmission;

means for calculating amplitude of variation of said rotational speed and for producing a signal representing said amplitude;

operating means responsive to the signal for operating the spool control means so as to control the pressure of the oil to increase slipping of the lockup clutch with increase of the amplitude;

said operating means comprises a clutch torque providing section, a lockup on deciding section, a lockup off deciding section, and a duty cycle providing section operatively connected to said spool control means and to the other of said sections; and said operating means is operated in response to a low vehicle speed driving range detected by said sensor and a lockup on condition of the lockup clutch decided by said lockup on deciding section only when said amplitude increases greater than a first predetermined amplitude but less than a second predetermined amplitude which is greater than said first predetermined amplitude.

* * * * *